(12) United States Patent
Okada et al.

(10) Patent No.: US 7,735,092 B2
(45) Date of Patent: *Jun. 8, 2010

(54) NETWORK SYSTEM AND OBJECT COOPERATION THEREIN

(75) Inventors: Makoto Okada, Fukuoka (JP);
Tadashige Iwao, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/652,485

(22) Filed: Sep. 2, 2003

(65) Prior Publication Data

US 2004/0044675 A1    Mar. 4, 2004

Related U.S. Application Data

(63) Continuation of application No. 09/126,324, filed on Jul. 31, 1998, now Pat. No. 6,622,143.

(30) Foreign Application Priority Data

Sep. 24, 1997 (JP) .................................. 9-258479
Mar. 19, 1998 (JP) ................................ 10-071024

(51) Int. Cl.
G06F 3/00 (2006.01)
G06F 9/44 (2006.01)
G06F 9/46 (2006.01)
G06F 13/00 (2006.01)

(52) U.S. Cl. ........................ 719/318; 719/319; 709/245

(58) Field of Classification Search ......... 719/310–320, 719/328–330; 709/200–203; 707/10, 101; 715/700, 701, 730–748, 751–761, 764–855

See application file for complete search history.

(56) References Cited

U.S. PATENT DOCUMENTS

| 5,363,507 | A | * | 11/1994 | Nakayama et al. | 715/743 |
| 5,446,842 | A | * | 8/1995 | Schaeffer et al. | 709/205 |
| 5,844,553 | A | * | 12/1998 | Hao et al. | 715/733 |
| 5,845,282 | A | | 12/1998 | Alley et al. | |
| 5,864,862 | A | * | 1/1999 | Kriens et al. | 707/103 R |
| 5,887,170 | A | * | 3/1999 | Ansberry et al. | 709/204 |
| 6,049,800 | A | | 4/2000 | Govindarajan et al. | |

(Continued)

FOREIGN PATENT DOCUMENTS

WO    WO 98/24235    * 6/1998

OTHER PUBLICATIONS

C. Schuckmann, et al "Designing Object-Oriented Synchronous Goupware with CAOST", ACM, 1996, pp. 30-38.*

(Continued)

*Primary Examiner*—Diem K Cao
(74) *Attorney, Agent, or Firm*—Staas & Halsey LLP

(57) ABSTRACT

An object cooperative network system for executing processing in cooperation between objects connected by a common communication path. Each of the objects includes a transmitting section to transmit messages that include predetermined information to the network system. In addition, each object includes a monitoring section to monitor the predetermined information of the transmitted messages, and a reaction table to indicate correspondence between the transmitted messages. Each of the objects sets information to which the object should respond in the monitoring section, and receives a message to execute processing by making reference to the reaction table when information to which the object should respond is detected.

7 Claims, 17 Drawing Sheets

U.S. PATENT DOCUMENTS

| | | | | |
|---|---|---|---|---|
| 6,212,577 | B1* | 4/2001 | Stern et al. | 719/329 |
| 6,324,542 | B1 | 11/2001 | Wright, Jr. et al. | |
| 6,324,567 | B2* | 11/2001 | Chidambaran et al. | 709/203 |
| 6,341,279 | B1* | 1/2002 | Nye | 707/3 |
| 6,622,143 | B1* | 9/2003 | Okada et al. | 707/101 |
| 6,647,432 | B1* | 11/2003 | Ahmed et al. | 719/318 |
| 6,836,891 | B2* | 12/2004 | Okada et al. | 719/313 |
| 2003/0079046 | A1* | 4/2003 | Cobbaert et al. | 709/310 |

OTHER PUBLICATIONS

A. Prakash, et al, "DistView: Support for Building Efficient Collaborative Applications Using Replicated Objects", ACM, 1994, pp. 153-164.*

Thefreedictionary.com, definition of "available", p. 1.*

Mukherjee et al., Villa: An Event Based Middleware for Real-time Collaboration on the Internet, IEEE, Sep. 1997, pp. 65-74.*

Linthicum, "CORBA, OLE, and OpenDoc: Three technologies for desktop components face off", Jan. 1996, Byte Magazine.

Heindel et al., "Highly reliable synchronous and asynchronous remote procedure calls", Computers and Communications, 1996, Conference Proceedings of the 1996 IEEE Fifteenth Annual International Phoenix Conference on, Mar. 27-29, 1996, pp. 103-107.

Khandker et al., "Performance of DCE RPC", Services in Distributed and Networked Environments, 1995, Second international Workshop on, Jun. 5-6, 1995, pp. 2-10.

Kwong et al. "Design and implementation of remote procedure call based on ISO/OSI reference model", TENCON '93, Proceedings, Computer, Communication, Control and Power Engineering, 1993, IEEE Region 10 Conference on Issue: O, Oct. 19-21, 1993, pp. 544-554.

* cited by examiner

| SUBJECT | VERB | OBJECT 1 | OBJECT 2 | PROCESSING CONTENT |
|---|---|---|---|---|
| * | MOUSEMOVE | * | * | MOVING THE MOUSE TO THE POINT (X,Y) WHERE OBJECT 1 AND OBJECT 2 ARE SET AS THE X,Y COORDINATES |
| HOSTA | LBUTTONDOWN | * | * | PRESSING DOWN THE LEFT BUTTON AT THE POINT (X,Y) WHERE OBJECT 1 AND OBJECT 2 ARE SET AS THE X,Y COORDINATES |
| HOSTB | LBUTTONUP | * | * | RELEASING UP THE LEFT BUTTON AT THE POINT (X,Y) WHERE OBJECT 1 AND OBJECT 2 ARE SET AS THE X,Y COORDINATES |
| HOSTC | LBUTTONDBLCLK | * | * | DOUBLE CLICK OF THE LEFT BUTTON AT THE POINT (X,Y) WHERE OBJECT 1 AND OBJECT 2 ARE SET AS THE X,Y COORDINATES |
| * | RBUTTONDOWN | * | * | PRESSING DOWN THE RIGHT BUTTON AT THE POINT (X,Y) WHERE OBJECT 1 AND OBJECT 2 ARE SET AS THE X,Y COORDINATES |
| * | RBUTTONUP | * | * | RELEASING UP THE RIGHT BUTTON AT THE POINT (X,Y) WHERE OBJECT 1 AND OBJECT 2 ARE SET AS THE X,Y COORDINATES |

| SUBJECT | VERB | OBJECT 1 | OBJECT 2 | PROCESSING CONTENT |
|---|---|---|---|---|
| * | MOUSEMOVE | * | | MOVING THE MOUSE TO THE POINT (X,Y) WHERE OBJECT 1 AND OBJECT 2 ARE SET AS THE X,Y COORDINATES |
| * | LBUTTONDOWN | * | * | PRESSING DOWN THE LEFT BUTTON AT THE POINT (X,Y) WHERE OBJECT 1 AND OBJECT 2 ARE SET AS THE X,Y COORDINATES |
| * | LBUTTONUP | * | * | RELEASING UP THE LEFT BUTTON AT THE POINT (X,Y) WHERE OBJECT 1 AND OBJECT 2 ARE SET AS THE X,Y COORDINATES |
| * | LBUTTONDBLCLK | * | * | DOUBLE CLICK OF THE LEFT BUTTON AT THE POINT (X,Y) WHERE OBJECT 1 AND OBJECT 2 ARE SET AS THE X,Y COORDINATES |
| * | RBUTTONDOWN | * | * | PRESSING DOWN THE RIGHT BUTTON AT THE POINT (X,Y) WHERE OBJECT 1 AND OBJECT 2 ARE SET AS THE X,Y COORDINATES |
| * | RBUTTONUP | * | * | RELEASING UP THE RIGHT BUTTON AT THE POINT (X,Y) WHERE OBJECT 1 AND OBJECT 2 ARE SET AS THE X,Y COORDINATES |

FIG. 7

| SUBJECT | VERB | OBJECT 1 | OBJECT 2 | PROCESSING CONTENT |
|---|---|---|---|---|
| * | ADDCLIPFILE | * | * | COPYING A FILE DEFINING OBJECT 1 AND OBJECT 2 AS DIRECTORY NAME AND FILE NAME TO THE CLIPBOARD |
| * | ADDCLIPTEXT | * | * | COPYING A FILE DEFINING OBJECT 1 AND OBJECT 2 AS DIRECTORY NAME AND FILE NAME TO THE CLIPBOARD |
| * | ADDCLIPMETAFILE | * | * | COPYING A FILE DEFINING OBJECT 1 AND OBJECT 2 AS DIRECTORY NAME AND FILE NAME TO THE CLIPBOARD |

| T1c | T2c | T3c | T4c | T5c |
|---|---|---|---|---|
| SUBJECT | VERB | OBJECT 1 | OBJECT 2 | PROCESSING CONTENT |
| HOSTB | MOUSEMOVE | * | * | DISPLAYING "HELLO" ON THE DISPLAY SECTION |

FIG. 10 — 101a

| I1a | I2a | I3a | I4a |
|---|---|---|---|
| SUBJECT | VERB | OBJECT 1 | OBJECT 2 |
| HOSTA | ADDCLIPTEXT | DIRA | FILEA |

FIG. 11 — 201b

| I1b | I2b | I3b | I4b |
|---|---|---|---|
| SUBJECT | VERB | OBJECT 1 | OBJECT 2 |
| HOSTB | MOUSEMOVE | 100 | 200 |

| SUBJECT | VERB | OBJECT 1 | OBJECT 2 | PROCESSING CONTENT |
|---|---|---|---|---|
| * | INQUIRY | * | * | DISPLAYING THE CONTENT OF INQUIRY BY DRIVING QUESTION AND ANSWER SYSTEM |
| * | DECISION | * | DECISION-MAKING | DISPLAYING THE CONTENT OF DECISION REQUEST BY DRIVING DECISION MAKING SYSTEM |
| HOSTA | MEETING | * | * | NOTIFYING THE IDLE CONDITION BY DRIVING SCHEDULE MANAGEMENT SYSTEM |
| HOSTC | MEETING | * | * | NOTIFYING THE IDLE CONDITION BY DRIVING SCHEDULE MANAGEMENT SYSTEM |

FIG. 12

| SUBJECT | VERB | OBJECT 1 | OBJECT 2 | PROCESSING CONTENT |
|---|---|---|---|---|
| * | INQUIRY | CLIENT/SERVER SYSTEM | * | DISPLAYING THE CONTENT OF INQUIRY BY DRIVING QUESTION AND ANSWER SYSTEM |
| HOSTA | MEETING | * | * | NOTIFYING THE IDLE CONDITION BY DRIVING SCHEDULE MANAGEMENT SYSTEM |
| HOSTB | MEETING | * | * | NOTIFYING THE IDLE CONDITION BY DRIVING SCHEDULE MANAGEMENT SYSTEM |

| I1a1 | I2a1 | I3a1 | I4a1 |
|---|---|---|---|
| SUBJECT | VERB | OBJECT 1 | OBJECT 2 |
| HOSTA | INQUIRY | CLIENT/SERVER SYSTEM | POINT TO BE CONSIDERED FOR STRUCTURING |

| I1a2 | I2a2 | I3a2 | I4a2 |
|---|---|---|---|
| SUBJECT | VERB | OBJECT 1 | OBJECT 2 |
| HOSTA | DECISION | DECISION-MAKING | ACQUISITION OF FACILITY |

| I1a3 | I2a3 | I3a3 | I4a3 |
|---|---|---|---|
| SUBJECT | VERB | OBJECT 1 | OBJECT 2 |
| HOSTA | MEETING | PROCESS CONFERENCE | PROJECT A |

| FLAG NAME | CONDITION OF FLAG | REACTION OF THE OTHER OBJECT | RETURNING TO THE FIELD |
|---|---|---|---|
| INFORM | 0 | REACTION | NONE |
|  | 1 | NON-REACTION | MACHING TABLE VALUE |
| FORCE | 0 | REACTION | NONE |
|  | 1 | REACTION | RETURNING VALUE AFTER EXECUTION OF MACHING FUNCTION |

JT1 BASIC TABLE

| JT1-1 SUBJECT | JT1-2 VERB | JT1-3 OBJECT 1 | JT1-4 OBJECT 2 | JT1-5 PROCESSING CONTENT | JT1-6 PARAMETER |
|---|---|---|---|---|---|
| SUBJECT-A | VERB-A1 | * | * | ACTION-A1 | PARAM-A1 |
| SUBJECT-B | VERB-B1 | * | * | ACTION-B1 | POINTER-α |
| SUBJECT-C | VERB-C1 | * | * | ACTION-C1 | POINTER-α |
| SUBJECT-B | VERB-B2 | * | * | ACTION-B2 | POINTER-β |
| SUBJECT-C | VERB-D1 | * | * | ACTION-D1 | POINTER-β |

JT2 CHECK LIST TABLE

POINTER-α

| JT2-1a SUBJECT | JT2-2a VERB | JT2-3a OBJECT 1 | JT2-4a OBJECT 2 | JT2-5a DETECTED FLAG | JT2-6a INVERTED FLAG | JT2-7a INFORMATION CONDITION FLAG |
|---|---|---|---|---|---|---|
| SUBJECT-B | VERB-B1 | * | * | 0 | 0 | INACTIVE |
| SUBJECT-C | VERB-C1 | * | * | 0 | 0 | INACTIVE |

POINTER-β

| JT2-1b SUBJECT | JT2-2b VERB | JT2-3b OBJECT 1 | JT2-4b OBJECT 2 | JT2-5b DETECTED FLAG | JT2-6b INVERTED FLAG | JT2-7b INFORMATION CONDITION FLAG |
|---|---|---|---|---|---|---|
| SUBJECT-B | VERB-B2 | * | * | 0 | 0 | INACTIVE |
| SUBJECT-D | VERB-D1 | * | * | 0 | 1 | ACTIVE |

JT3 FLAG CHECK TABLE

| DETECTED FLAG \ INVERTED FLAG | 0 | 1 |
|---|---|---|
| 0 | INACTIVE | ACTIVE |
| 1 | ACTIVE | INACTIVE |

FIG. 18

JT2  CHECK LIST TABLE
POINTER-α

| | JT2-1c | JT2-2c | JT2-3c | JT2-4c | JT2-5c | JT2-6c | JT2-7c | JT2-8c |
|---|---|---|---|---|---|---|---|---|
| | SUBJECT | VERB | OBJECT 1 | OBJECT 2 | DETECTED FLAG | INVERTED FLAG | INFORMATION CONDITION FLAG | REACTION CONTROL |
| | SUBJEC-B | VERB-B1 | * | * | 0 | 0 | INACTIVE | 100 |
| | SUBJECT-C | VERB-C1 | * | * | 0 | 0 | INACTIVE | 0 |

FIG. 20

NETWORK SYSTEM AND OBJECT COOPERATION THEREIN

This application is a Continuation of application Ser. No. 09/126,324, filed Jul. 31, 1998, now U.S. Pat. No. 6,622,143, and incorporated by reference herein.

BACKGROUND OF THE INVENTION

1. Field of the Invention

The present invention relates to a cooperation system for executing a cooperation process among dispersed objects, and more particularly, the present invention relates to a cooperation system which executes a process so that an individual computer system, or an individual application program running in the computer system, reacts by itself to various pieces of information flowing through communication paths defined as a common field.

2. Description of the Related Art

The recent introduction of network systems into various fields has resulted in an increase in the use of network systems having a plurality of objects dispersed on the network that are executing in cooperation with each other. As a result, research and development in the area has continued to be directed toward developing an object-oriented programming and component technique for executing a cooperation system process through the cooperation of a plurality of objects.

For example, a common specification, known as the Common Object Request Broker: Architecture and Specification ("CORBA") for dispersed object operation specified by a business field organization Object Management Group ("OMG") has been established, and is directed to the standardization and popularization of object-oriented technology.

An example of object cooperation in a client/server system based on a CORBA interface 1201 is illustrated in FIG. 22. In this object cooperation system, both a client application 1211 and a server application 1221 correspond to objects, and the object cooperation system executes a series of processes through object cooperation of client application 1211 and server application 1221.

An application developer describes an interface of the service offered by respective client application 1211 and server application 1221 with an Interface Definition Language ("IDL") 1202. Content that is defined as the interface is an operation group which can be requested for an object, and for each operation, an operation name, definition of parameter, definition of return value, exceptional process when an error is generated, and additional information are also defined.

A stub 1212 is produced for a client 121, and a skeleton 1222 is produced for a server 122, by compiling the content defined by IDL 1202 with an exclusive compiler. Stub 1212 is a routine group for providing access to an operation group defined by IDL 1202 to the client application 1211. The client application 1211 calls the routine offered by stub 1212 to start the operation. Skeleton 1222 provides a dispatch routine to a method routine offered by server application 1221.

Stub 1212 and skeleton 1222 are produced by a programming language used in the corresponding client application 1211 or server application 1221. For example, if C language is used as the programming language, stub 1212 is produced as a function group of C language. Client application 1211 calls the relevant routine of the server application via stub 1212, an ORB run time 1203 and skeleton 1222 by calling the function corresponding to the operation to be executed. After execution of the predetermined process, the processing result is returned to client application 1211 as the call originator.

While it is rather easy to establish an object cooperation process with CORBA, etc., when establishment of the object cooperation process is attempted, it is necessary to understand CORBA in order to both design the object according to specifications of CORBA, and to define the object using the IDL. In this way, it is essential for a person who attempts to establish the system to fully understand the application method.

Moreover, it is also necessary for a user to be intensively aware of the relationship of respective objects. For example, a user must initially clarify a process that is to be executed by each of the respective objects, for example client application 1211 and server application 1221, and must define a parameter that should be used to execute the process.

The independence of each object has been enhanced by common use of the interface between the objects, but there is a consistent precondition that a fixed relationship exist between the objects. But such a fixed relationship does not serve to enhance the amount of freedom cooperation of the system that is most desired. For example, when two people communicate with each other, there are uncertain exchanges of words that are often generated. For instance, when an attempt is made to solve a problem, a scheme for solving the problem is derived, for example, by either thinking of ways to solve the problem, or by asking another person for suggestions on how to solve the problem. Even in the case where a solution to the problem is discovered, investigations have usually been performed from various points of views. When a person asks for suggestions from another person, the inquiry is made either to a particular person, or to many people in a wide area. When a person asks for suggestions from many people in a wide area, reactions will usually differ from person to person. A person will offer a suggestion by making judgments based on both experience and knowledge, and therefore the solution may not be the most direct means for solving the problem. If the person is generally not interested in the particular problem, he or she may not attempt to make a complete inquiry into the problem, or may ignore certain factors. In this way, whether a person reacts to certain information differs, depending on the condition of a person who has received such information. Moreover, when a person does react to the information, the reaction also differs depending on the condition of the person receiving the information.

When a human being is replaced with an object, the desired relationship between objects is one of free cooperation, in which respective objects receive or do not receive the information transmitted, and where the process to be executed in response to the information received is different. In the cooperation method of the related prior art, the relationship between objects is fixed as a consistent precondition, and therefore it has been difficult to establish a cooperation system having such free relationships.

BRIEF SUMMARY OF THE INVENTION

It is therefore an object of the present invention to provide an enhanced amount of freedom of cooperation between objects connected to a network.

Objects of the invention are achieved by a network system that connects a plurality of computers, in which each of the plurality of computers a transmitting section to transmit messages. In addition, each computer includes a monitoring section to monitor predetermined information of the transmitted messages, a reaction table to indicate correspondence between the transmitted messages, and an executable program that processes the predetermined information. Each of the computers individually sets information to which the computer should respond in the monitoring section, and receives a message to execute processing by making reference to the reaction table when information to which the computer should respond is detected.

Objects of the invention are achieved by an object cooperation system for executing processing in cooperation between a plurality of objects connected by a common communication path. The object cooperation system includes an information transmitting section to produce information in a predetermined format and to transmit the information to the common communication path. An information reaction table specifies transmitted information to which a response is made and defines a processing content to be executed for the response, and an information detecting section detects the transmitted information. The information detecting section retrieves the information reaction table when transmitted information is detected, identifies whether the detected transmitted information is specified, and executes the processing content when the transmitted information is specified.

Objects of the invention are achieved by a method for processing in cooperation in a network which includes detecting information transmitted to a common communication path, determining information to which a response is to be made, selecting a processing content to be executed in the response, and issuing a command to initiate execution of the selected processing content.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 3 is table illustrating contents of an information reaction table according to a preferred embodiment of the present invention

FIG. 7 is a table illustrating contents of an information reaction table according to a preferred embodiment of the present invention.

FIG. 8 is a table illustrating contents of another information reaction table according to a preferred embodiment of the present invention.

FIG. 9 is a table illustrating contents of yet another information reaction table according to a preferred embodiment of the present invention.

FIG. 10 is a table illustrating information transmitted from an information transmitting section according to a preferred embodiment of the present invention.

FIG. 11 is a table illustrating information transmitted from an information transmitting section according to a preferred embodiment of the present invention.

FIG. 12 is a table illustrating information transmitted from an information reaction table according to a preferred embodiment of the present invention.

FIG. 13 is a table illustrating contents of an information reaction table according to a preferred embodiment of the present invention.

FIG. 14 is a table illustrating information transmitted from an information transmitting section according to a preferred embodiment of the present invention.

FIG. 15 is a table illustrating information transmitted from an information transmitting section according to a preferred embodiment of the present invention.

FIG. 16 is a table illustrating information transmitted from an information transmitting section according to a preferred embodiment of the present invention.

FIG. 17 is a table illustrating a flag added to information transmitted from an information transmitting section according to a preferred embodiment of the present invention.

FIG. 18 is a table illustrating contents of an information reaction table according to a preferred embodiment of the present invention.

FIG. 20 is a check list table according to a preferred embodiment of the present invention.

DETAILED DESCRIPTION OF THE PREFERRED EMBODIMENTS

Figures 1, 2:
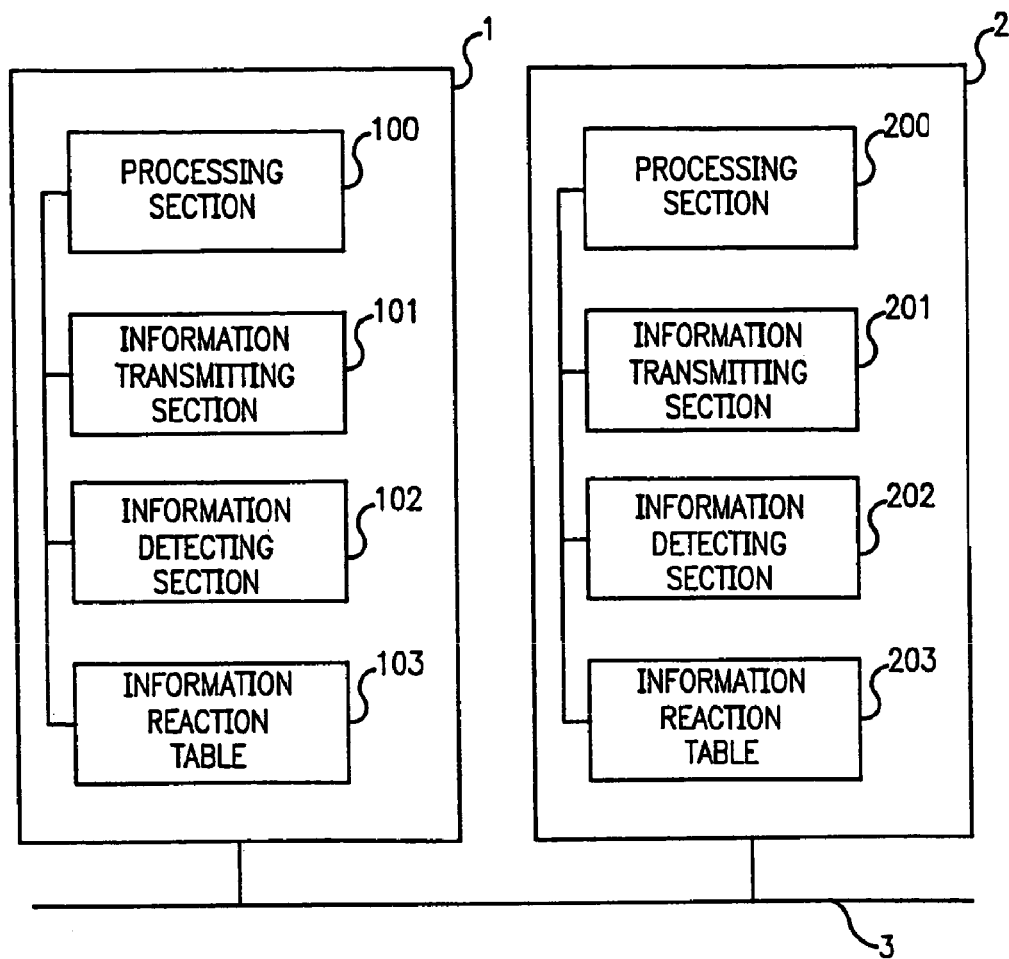
FIG. 1 is a schematic diagram illustrating an object cooperation method according to a preferred embodiment of the present invention.
FIG. 2 is a table illustrating information transmitted from an information transmitting section according to a preferred embodiment of the present invention.

Reference will now be made in detail to the preferred embodiments of the present invention, examples of which are illustrated in the accompanying drawings, wherein like reference numerals refer to like elements throughout.

A network system utilizing an object cooperation method according to a preferred embodiment of the present invention will be explained below.

An object cooperation method according to a preferred embodiment of the present invention is illustrated in FIG. 1. While a network system typically includes a number of objects, the network system illustrated in FIG. 1 includes only two objects, object 1 and object 2, as a way to simplify the explanation. In the network system, each of objects 1, 2 are connected with each other via a common communication path 3, and have corresponding processing sections 100, 200 to execute processes corresponding respectively to each object 1, 2. Each of the plurality of objects 1, 2 also includes a respective information transmitting section 101, 201 for transmitting information that originates from objects 1, 2, respectively, a respective information detecting section 102, 202 for monitoring information transmitted through a common communication path 3, and a respective information reaction table 103, 203 for defining information to be reacted to and the processing content to be executed by corresponding objects 1, 2, respectively.

Since information transmitting sections 101, 201 included for each respective object 1, 2 are connected with communication path 3, information to be transmitted to common communication path 3 from objects 1, 2 is produced and transmitted in a predetermined format.

Information detecting sections 102, 202 monitor information transmitted to common communication path 3, and retrieve information reaction tables 103, 203 upon detection of information, to judge whether a reaction, or response should be made to the information. When the information is judged as information to which a reaction or response should be made, information detection sections 102, 202 execute a process defined in information reaction tables 103, 203. When the information is judged as the information to which reaction should not be made, information detecting sections 102, 202 continue monitoring without executing a process.

The information reaction tables 103, 203 define the content of the process that should be executed when information reaction tables 103, 203 react to the information transmitted through the common communication path 3 in each object 1, 2, respectively.

Objects 1, 2 may be applications in their own respective computer that is connected via a communication line with other computers, or objects 1, 2 may be applications existing in the same computer. For the convenience of explanation, objects 1, 2 are assumed to be applications working in respective computers connected by a communication line. The communication line may, for example, be a local area network "LAN", or any other similar means.

An example of a format of the content of information produced by information transmitting sections 101, 201 and transmitted to common communication path 3, is illustrated in FIG. 2. It is assumed that the format of the information includes a subject, a verb, an object 1 and an object 2.

An identifier for identifying objects 1, 2 as the source of transmitted information is provided as a subject I1. A host name HOSTA that is assigned to a computer system in which objects 1, 2 are working is set.

A verb I2 sets the type of information that is being transmitted from objects 1, 2, and also sets a name of a command indicating an operation content, depending on operations conducted in objects 1, 2.

A parameter for transmission and reception that is required, depending on verb I2, is set for object 1 I3 and object 2 I4. It is important that the information is in a unified format throughout the cooperative system and is not limited only to this particular format.

An example of the content of information reaction tables 103, 203 is illustrated in FIG. 3. The tables are respectively provided with a subject T1, a verb T2, an object 1 T3 and an object 2 T4, corresponding respectively to contents of information transmitted by information transmitting sections 101, 201, explained above. Subject T1, verb T2, object 1 T3, and object 2 T4 are used as keys in information detecting sections 102, 202 for collation of information transmitted from common communication path 3. Moreover, information reaction tables 103, 203 also include a processing content T5 defining a process to be executed in relevant objects 1, 2 when such pieces of information are matched.

Figure 4:
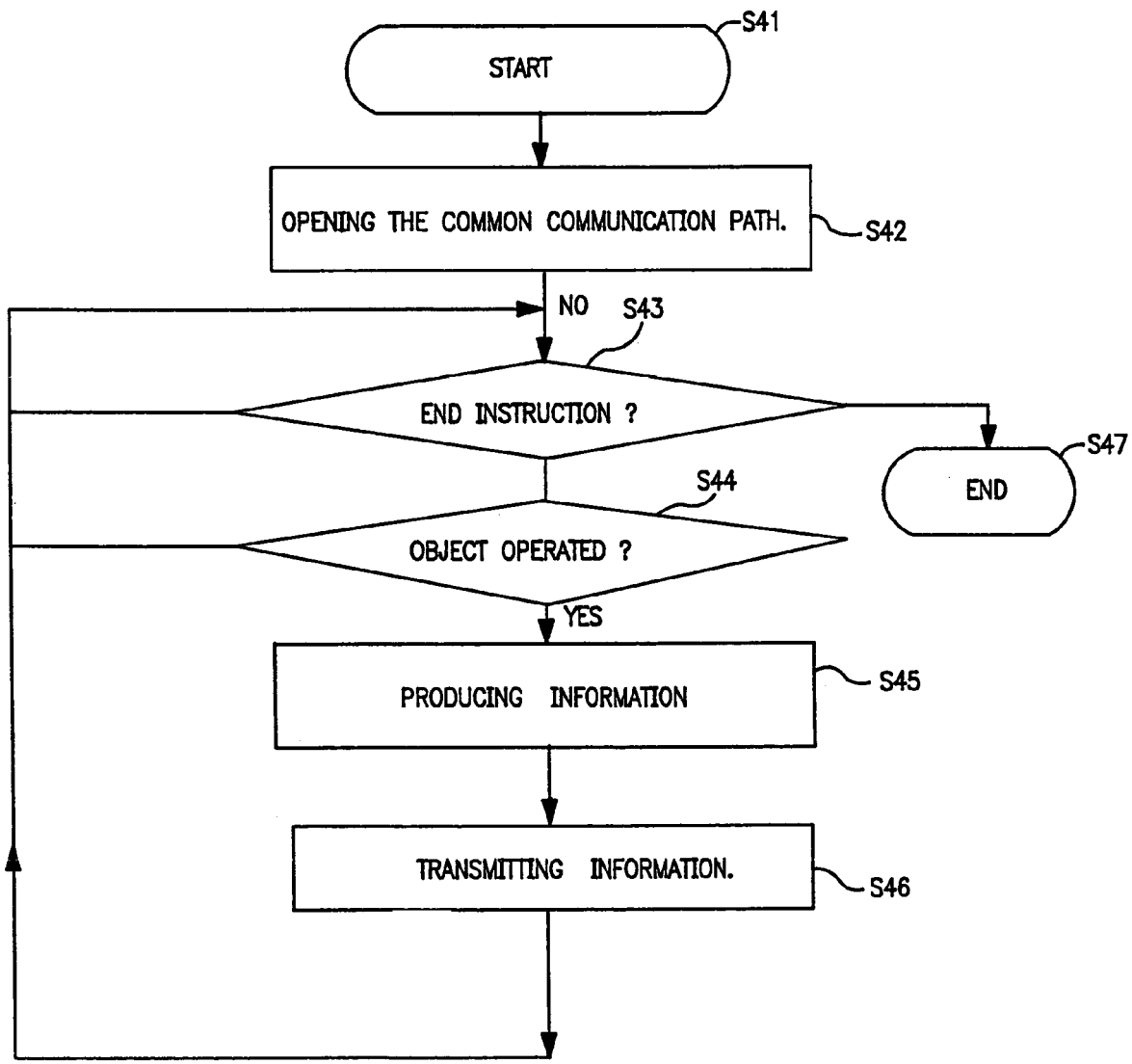
FIG. 4 is a flowchart illustrating a transmission process of an information transmitting section according to a preferred embodiment of the present invention.

A flowchart of the processing content of information transmitting sections 101, 201 is illustrated in FIG. 4. Upon activation of information transmitting sections 101, 201 in step S41, common communication path 3, used as the information transmission path, is opened in step S42. This opening process is not required every time the information transmitting section is activated. Rather, it is enough that common communication path 3 is opened once when information transmitting section 101, 201 transmits information from objects 1, 2, and thereafter, common communication path 3 is opened automatically.

Information transmitting sections 101, 201 monitor the timing corresponding to transmission of information from objects 1, 2 in step S44 until an end instruction is generated in step S43. The timing is set to correspond to an execution of any operation in objects 1, 2. When the operation is conducted in objects 1, 2. (YES in step S44), the information to be transmitted is produced in step S45 and is then transmitted to common communication path 3 in step S46. The information transmitted from information transmitting sections 101, 201 is sequentially transmitted to objects 1, 2 via common communication path 3.

Figure 5:
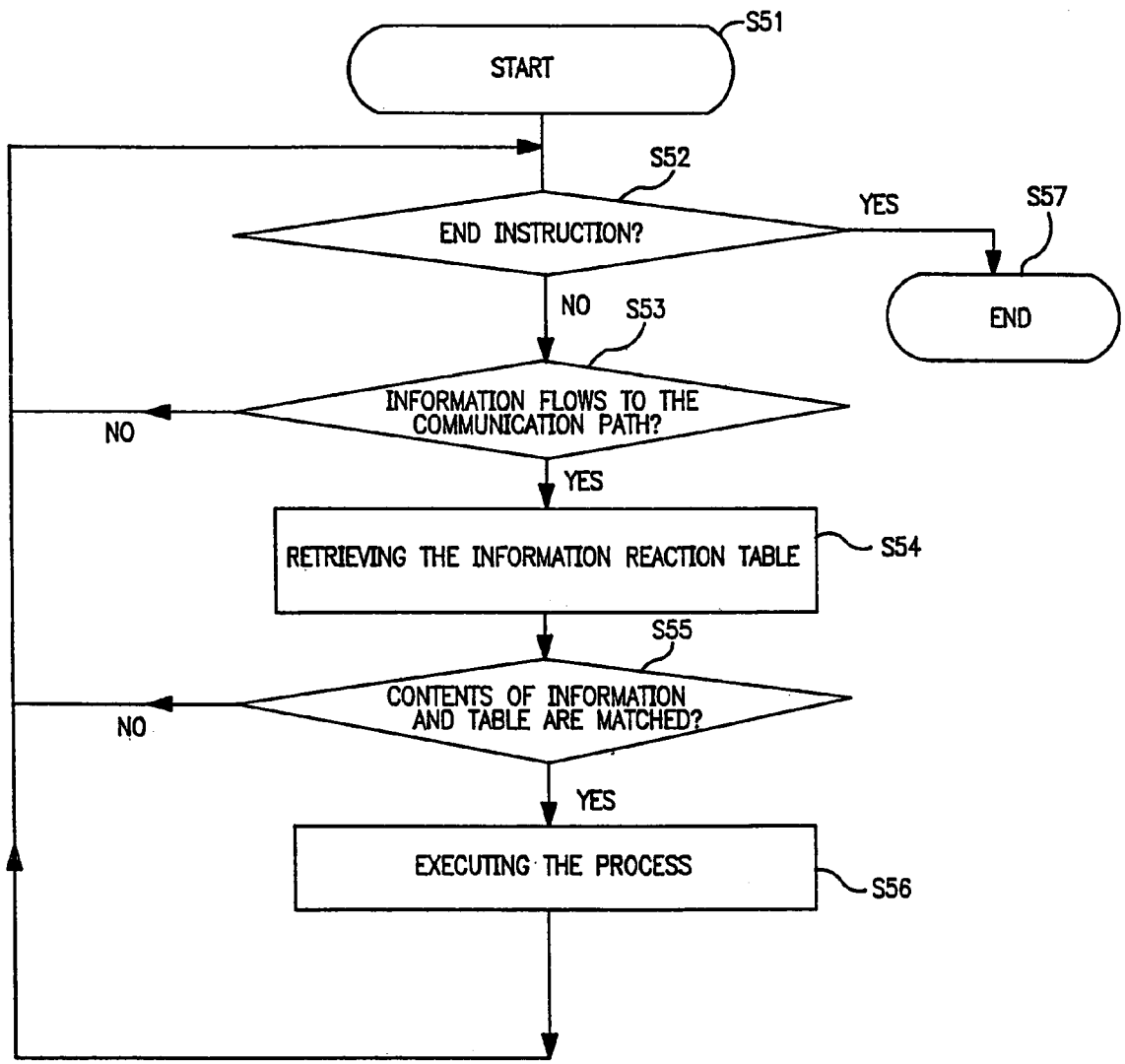
FIG. 5 is a flowchart illustrating a detection process of an information detection section according to a preferred embodiment of the present invention.

A flowchart indicating the processing contents of information detecting sections 102, 202 is illustrated in FIG. 5. When activated in step S51, information detecting sections 102, 202 monitor the information transmitted through common communication path 3 until an end instruction is generated in step S57 by a YES in step S52. When information is transmitted to common communication path 3 (YES in step S53), information reaction tables 103, 203 are retrieved on the basis of the information received in step S54. When the received information matches the registration content of information tables 103, 203 (YES in the step S55), the corresponding processing content T5 is executed in step S56. When the received information does not match the registration content (NO in step S55), information detecting sections 102, 202 continue monitoring and do not conduct an operation (step S53).

Figure 6:
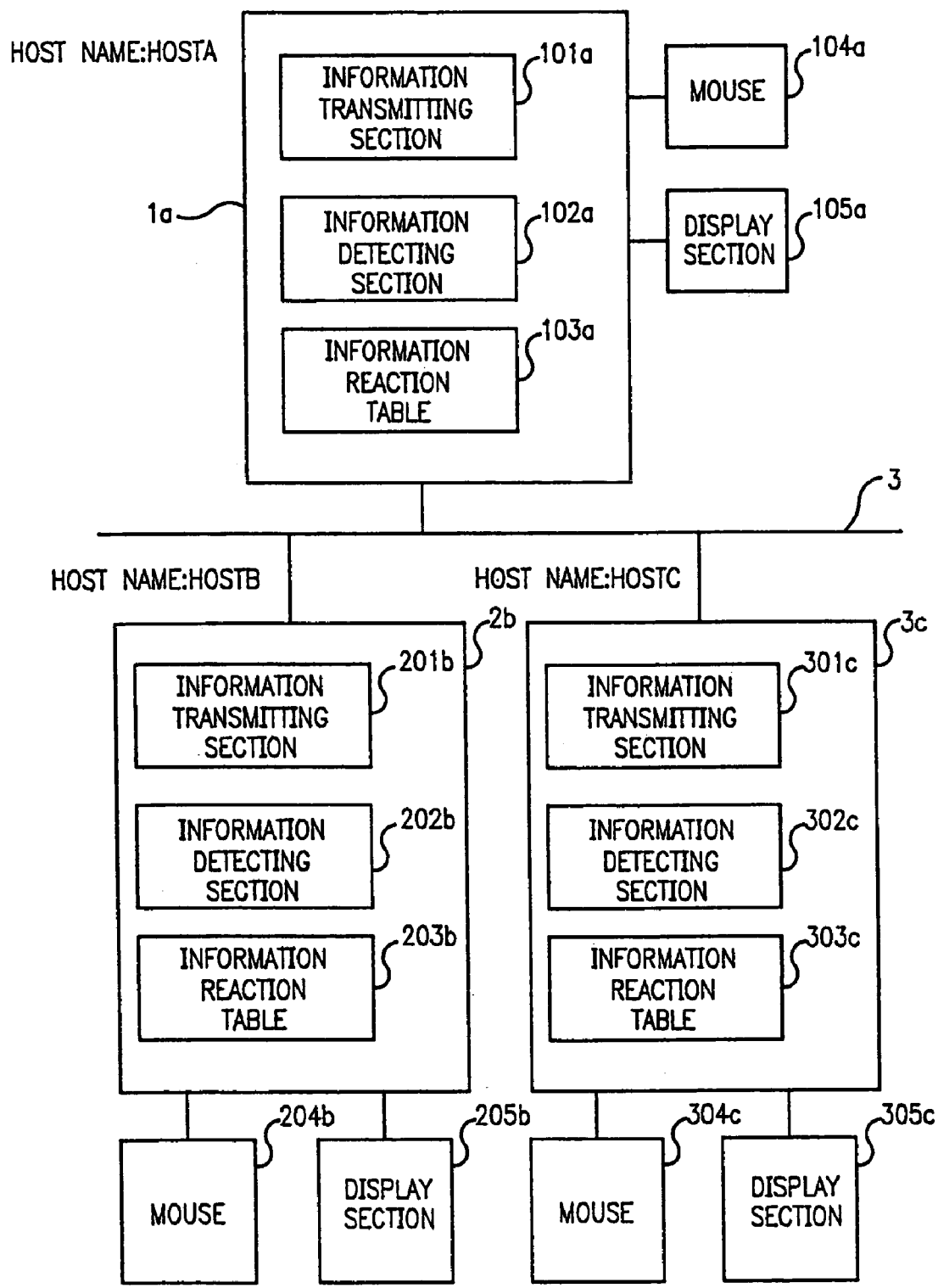
FIG. 6 is a schematic diagram illustrating transfer of information between objects according to a preferred embodiment of the present invention.

A diagram of the structure corresponding to a first preferred embodiment of the present invention is illustrated in FIG. 6.

A plurality of computer systems 1a, 2b, 3c are mutually connected with each other via common communication path 3, which, as described above, may be a LAN or other similar communication means. As illustrated in FIG. 6, computer system 1a has a host name HOST A, computer system 2b has a corresponding host name HOST B, and computer system 3c has a corresponding host name HOST C.

Each of computer systems 1a, 2b, 3c includes a corresponding information transmitting section, 101a, 201b, 301c, respectively, an information detecting section 102a, 202b, 302c respectively, and an information reaction table 103a, 203b, 303c, respectively. Likewise, each of computer systems 1a, 2b, 3c include a corresponding mouse 104a, 204b, 304c, respectively, and display section 105a, 205b, 305c, respectively. The processing content of information registered in information reaction table 103a of computer system 1a is illustrated in FIG. 7. An operation corresponding to operation of a mouse is registered in verb T2a. Since the content of a subject T1a is "I", it means that a reaction is made to a mouse operation executed in all computer systems 1a, 2b, 3c connected to common communication path 3.

The processing content of information registered in information reaction table 203b of computer system 2b is illustrated in FIG. 8. An operation corresponding to a file copy is registered in verb T2b. Since the content of subject T1b is "*", a. reaction is made to a file copying operation conducted in all computer systems 1a, 2b, 3c connected to common communication path 3.

The processing content of information registered in information reaction table 303c of computer system 3c is illustrated in FIG. 9. Information reaction table 303c reacts to the mouse operation, but since subject T1c is set to HOSTB, information reaction table 303c reacts to only the cursor moving operation of mouse 204b of computer system 2b, which is different from information reaction table 103a of computer system 1a.

It is assumed that when a file is copied in computer system 1a, the file copying operation is conducted in such a manner that text data that is provided as a basic function in basic softwares of a personal computer is copied by a cut & paste method. For example, the copying operation is instructed with software for editing text data by designating a copying area of the text data with a mouse, etc. When this operation is conducted, information transmitting section 101a produces information indicating that a file copying operation is conducted in computer system 1a. The content of information to be produced by information transmitting section 101a is illustrated in FIG. 10.

Host name HOSTA of computer system 1a is set in subject I1a of information transmitting section 101a. An "AddClipText", indicating that copying of the text data is conducted, is set in verb I2a. A directory name indicating an area for temporarily storing text data to be copied and a file name are set in object 1 I3a and object 2 I4a respectively. These pieces of information are transmitted, when generated, to common communication path 3.

Upon reception of the information of information transmitting section 101a transmitted through common communication path 3, as explained above, information detecting section 202b of computer system 2b retrieves information reaction table 203b. The fact that "AddClipText" is set in verb I2a of information transmitting section 101a is registered in verb T2b of information reaction table 203b, and subject T1b of information reaction table 203b is set to "*". Therefore, information detecting section 202b judges that the information transmitted matches the content of information reaction table 203b, and then executes a corresponding processing content T5b that is registered in information reaction table 203b. The content of text data saved by the copying operation is recovered.

However, in computer system 3c, since reaction to the file copying operation is not registered in information reaction table 303c, no reaction is carried out in response to the information of information transmitting section 101a that is transmitted from computer system 1a.

Next, a cursor moving operation by mouse 204b in computer system 2b will be explained. Information transmitting section 201b of computer system 2b produces information which indicates that the cursor moving operation by mouse 204b has been conducted in computer system 2b. The content of the information produced by information transmitting section 201b is illustrated in FIG. 11.

Host name "HOSTB" of computer system 2b is set in subject I1b. "MouseMove", indicating that the cursor moving operation is conducted by mouse 204b is set in verb I 2b. Positional information of the cursor when moved by mouse 204b is set in object 1 I3b and object 2 I4b by acquiring coordinate data of display section 205b. Information transmitting section 201b transmits the information produced to common communication path 3.

Upon detection of the information transmitted, information detecting section 102a of computer system 1a retrieves information reaction table 103a. Referring again to the content of information reaction table 103a illustrated in FIG. 7, reaction to the mouse operation of all computer systems 1a, 2b, 3c is conducted in information reaction table 103a, a single "MouseMove" is set in verb T2a of information reaction table 103a, and subject T1a is set as "*". Therefore, information detecting section 102a judges that the information transmitted matches the content of information reaction table 103a and executes corresponding processing content T5a that is registered in information reaction table 103a. The same operation corresponding to the cursor moving operation by mouse 204b conducted in computer system 2b is also executed by display section 105a of computer system 1a.

Referring again to the content of information reaction table 303c of computer system 3c of FIG. 9, in the information concerning the mouse operation registered in information reaction table 303c, a host name "HOSTB", indicating computer system 2b, is registered in subject T1c, and "MouseMove", indicating the cursor moving operation by the mouse, is registered in verb T2c. Therefore, information detecting section 302c judges that the information transmitted matches the content of information reaction table 303c because subject I1b of the information transmitted matches subject T1c of information reaction table 303c, and verb I2b of the information transmitted matches verb T2c of information reaction table 303c. As a result, processing content T5c registered in information reaction table 303c is executed. Character string "Hello" is displayed on display section 305c of computer system 3c, and a user of computer system 3c knows that a user of computer system 2b is operating the computer system. In this embodiment, when considered as a simplified attendance management system, a user of computer system 3c an detect that a user of computer system 2b is operating the computer system by displaying the character string "Hello" on display section 305c, and can take proper action such as making a telephone call, going to the user's seat or sending a message to request verification of mail or a facsimile already transmitted.

As explained above, it is possible that the respective computer systems receive the same information to conduct the operation in the same manner, depending on the content of information reaction tables 103a, 203b, 303c registered in computer systems 1a, 2b, 3c. It is also possible for individual computer systems 1a, 2b, 3c to conduct different operations, and moreover, not to react to the information being transmitted by registering the setting to the information reaction table.

Next, a second preferred embodiment of the present invention will be explained below.

A structure of this preferred embodiment is assumed to be same as the structure of the first preferred embodiment illustrated in FIG. 6, and therefore an explanation will be omitted.

The contents of information reaction table 203b of computer system 2b in this preferred embodiment is illustrated in FIG. 12. An item generated within daily jobs, such as a request for "Inquiry", "Decision" and "Meeting" is registered in verb T2b 1. In regard to "Inquiry", "*" is designated in subject T1b1, object 1 T3b1 and object 2 T4b1. This means that a reaction is made to any inquiry from any person. In regard to "Decision", a reaction is made to any request from any person for a result of the decision making. In regard to "Meeting", a reaction is made to a request only from computer system 1a and computer system 3c, since only HOSTA and HOSTC are registered in subject T1b1.

The content of information reaction table 303c of computer system 3c is illustrated in FIG. 13. Both a request for "Inquiry" and a request for "Meeting" are registered in verb T2c1. Since "*" is designated in subject T1c1, and a "client/server system" is designated in object 1 T3c1 "Inquiry" indicates that reaction is made to an inquiry from any person in regard to only the inquiry for the client/server system. In regard to the "Meeting", since HOSTA and HOSTB are registered in subject T1C1, a reaction is made only to the request from computer systems 1a, 2b.

It is assumed that computer system 1a has issued an inquiry of points to be considered to form the client/server system, and the corresponding content of the information to be produced by information transmitting section 101a is illustrated in FIG. 14.

Host name "HOSTA" of computer system 1a is set in subject I1a1, "Inquiry" is set in verb I2a1, "Client/server system" is set in object 1 I3a1 as a large item of the inquiry content, and "Point to be considered for structuring" is set in object 2 I4a1 as the small item of the inquiry content. When this information is produced, it is transmitted to common communication path 3.

Upon reception of the information transmitted by information transmitting section 101a through common communication path 3, information detecting section 202b of computer system 2b retrieves information reaction table 203b. Referring again to FIG. 12, "Inquiry", which is set in verb I2a1 of information transmitting section 101a, is registered in verb T2b1 of information reaction table 203b, and "*" is set in the subject T1b1, object 1 T3b1 and object 2 T4b1. Therefore, information detecting section 202b judges that the information transmitted by information transmitting section 101a matches the content of information reaction table 203b and executes processing content T5b1 registered in information reaction table 203b. A question answering system is activated to display the inquiry content.

"Inquiry" is also registered in information reaction table 303c, and, as illustrated in FIG. 13, the inquiry content to which reaction should be made is limited to the "Client/server system" in object 1 T3c1. But, since the inquiry from computer system 1a relates to the client/server system, reaction is made to this inquiry.

Next, it is assumed that a result of decision making is requested from computer system 1a.

Information transmitting section 101a of computer system 1a produces the information illustrated in FIG. 15. Host name "HOSTA" of computer system 1a is set in subject I1a2. "Decision", indicating a request of decision is set in verb I2a2. "Decision making" is set in object 1 I3a2 as a large item of a decision request content. "Acquisition of facility" is set in object 2 I4a2 as a small item of the decision request content. When this information is produced, it is then transmitted to common communication path 3.

Information detecting section 202b of computer system 2b retrieves, upon reception of the information transmitted through common communication path 3, information reaction table 203b. In information reaction table 203b, "Decision" which is set in verb I2a2 of information transmitting section 101a is registered in verb T2b1 of information reaction table 203b, object 1 T3b1 is "Decision making" and subject T1b1 and object 2 T4b1 is "*". Therefore, information detecting section 202b judges that the information being transmitted by information transmitting section 101a matches the content of information reaction table 203b, and executes processing content T5b1 registered in information reaction table 203b. A decision making system is activated to verify the decision request content.

Computer system 3c does not execute a reaction or response because a registration is not executed in regard to "Decision" in information reaction table 303c.

Computer system 1a can be operated by a secretary, for example. If "Display the content of decision request and a receiving person" is registered when "*" is set as the content of subject T1a of information reaction table 103a of computer system 1a, "Decision" is set to verb T2a and "*" is set as object 1 T3a and object 2 T4a, both the content and a receiving person are sequentially displayed by computer system 1a each time the request for a decision is issued. As a result, location of a document for decision making on the discussion route can be detected.

When calling a meeting from computer system 1a, for example, information transmitting section 101a of computer system 1a produces the information illustrated in FIG. 16. Host name "HOSTA" of computer system 1a is set in subject I1a3. "Meeting", indicating the request for a meeting, is set in verb I2a3. "Process conference" is set as the large item of the meeting in object 1 I3a3 and "Project A" is set as the small item of the meeting in object 2 I4a3. This generated information is then transmitted to common communication path 3.

Information detecting section 202b of computer system 2b retrieves information reaction table 203b upon reception of the information transmitted through common communication path 3. Since it is registered in information reaction table 203b that any reaction is made to any kind of inquiry, if it is requested from computer systems 1a, 3c, because "Meeting" set in verb I2a3 of the information is registered to verb T2b1, information detecting section 202b judges that the information transmitted matches the content of information reaction table 203b, and executes processing content T5b1 that is registered. Here, a schedule management system is activated, and an idle condition is notified. A similar reaction is also conducted in computer system 3c from the content of information reaction table 303c.

As explained above, it is possible to form a cooperation system, such as groupware for example, to promote a common job by sharing the job with a plurality of persons, and it is also possible to form the cooperation system within a corporation by previously setting the processing contents to reflect, or prioritise the transmission of the information according to the working positions of the persons involved.

An example embodying the preferred embodiments of the present explained above will be explained hereunder.

First, an example for defining the common communication path and format of the signal supplied thereto is indicated below.

Virtual void Init(CWnd *pwnd, int PORT=FIELDPORT);
virtual void wisper(const char *subject, const char *verb, const char *object, const char *object2, BOOL Inform=TRUE, BOOL Force=FALSE);

In this example, the common communication path is formed by defining the Class to each object with the function explained above. Here, the function Init opens the common communication path and the function wisper supplies the information to the common communication path. The structure of function wisper is defined by the following function.

typedef struct_wisp{cha inf; char force; char subject[16]; char verb[16]; char obj[128]; char obj2[128];} FIELDWISP;

Here, subject corresponds to the subject of the information transmitted from the information transmitting section explained above, while verb to verb of the same, obj to object 1 and obj2 to object 2.

When the function wisper is called, it sets the information to the structure body wisp explained above, and then transmits the information to the common communication path opened by the function Init.

Next, an example of a practical definition of the information reaction table is indicated below. First, an example of a definition of a structure of information reaction table is indicated below.

Typedef struct_satab {char subject[16]; char verb[16]; char obj[128]; char obj2[128]; REACTFUNC func; char param[256];} SATABITEM;

A structure body explained above is defined in the Class in each object, and the object groups connected to the common communication path in the present invention are completely converted to the derivative objects from those defined in the class. Here, subject, verb, obj, obj2 and func respectively correspond to the subject, verb, object 1, object 2 and processing content of the information reaction table explained above. Param is prepared for the case where exchange of parameter is required on the occasion of executing the processing content func.

Registration of content to the information reaction table is executed by the following functions.

```
Void CreateSAtab( );
void SetTab(const char *verb, const char *object, REACTFUNC func);
void SetTab(const char *subject, const char *verb, const char *object, const char *object2, REACTFUNC func);
void SetTab(const char *subject, const char *verb, const char *object, const char *object2, REACTFUNC func, const char *param);
BOOL DelTab(const char *subject, const char *verb, const char *object, const char *object2, REACTFUNC func);
```

Here, the function CreateSAtab is used for producing the information reaction table in which the structure body saTab is arranged, while the function SetTab, function DelTab are used for addition and deletion to the information reaction table.

Next, an example of an actual definition of the information detecting section is indicated.

```
void React(FIELDWISP *wisp);
```

The function React, reacts depending on content of own information reaction table from the information flowing through the common communication path. When there is a structure body wisp, explained above, which is matched with the content of the information reaction table as a result of monitoring and detection thereof, the processing content registered in the information reaction table is executed.

The functions explained above are not limited to the particular means described, but may include any similar means for performing the function.

Next, a preferred embodiment of the present invention for conducting complicated processes while maintaining free cooperation of the objects will be explained below.

A basic structure for realizing a preferred embodiment of the present invention is similar to the content illustrated in FIG. 6, but the contents of information reaction tables 103a, 203b, and 303c have a structure that is illustrated in FIG. 18. Namely, this structure is formed by a basic table JT1 in which the information to be reacted to and processing content to be executed are set, a check list table JT2 (first extension table) where only information which becomes the object when the process is executed after a plurality pieces of information is detected among the information registered in basic table JT1, and a flag check table JT3 (second extension table) for judging the active condition of the detected information.

An example of the content of basic table JT1 will be explained. In this preferred embodiment of the present invention, the format of information transmitted through the common communication path is determined by assuming a format similar to that of the previous preferred embodiments. Namely, contents from subject JT1-1 to processing content JT1-5 are similar to the preferred embodiments explained above. The region of a parameter JT1-6 is prepared for setting a pointer of check list table JT2 or a more complicated condition required for executing a content set in processing content JT1-5.

Next, an example of the content of check list table JT2 will be explained. As illustrated in FIG. 18, a region from subjects JT2-1a, JT2-1b to objects 2 JT2-4a, JT2-4b indicates a content similar to that of basic table JT1, and becomes a key for retrieving the detected information. A region of detected flag regions JT2-5a, JT2-5b indicates whether relevant information is detected. Here, an initial value is "0", and when the relevant information is detected, a value "1" is set. Thereby, an AND control becomes possible. When NOT is designated at the time of setting the conditions, "1" is set to inverted flag regions JT2-6a, JT2-6b. When NOT is not designated, "0" is set to inverted flag regions JT2-6a, JT2-6b. Information condition flag regions JT2-7a, JT2-7b are used for setting an active condition of the information from the contents of detected flag regions JT2-5a, JT2-5b and inverted flag regions JT2-6a, JT2-6b when the information is detected. When an active condition is judged, "Active" is set to this region, while, when the non-active condition is judged, "Inactive" is set.

Flag check table JT3 is a condition table to set JT2-7a, JT2-7b to an active or inactive with the detected flag JT2-5A, JT2-5b and the inverted flag JT2-6a, JT2-6b explained above.

Figure 19:
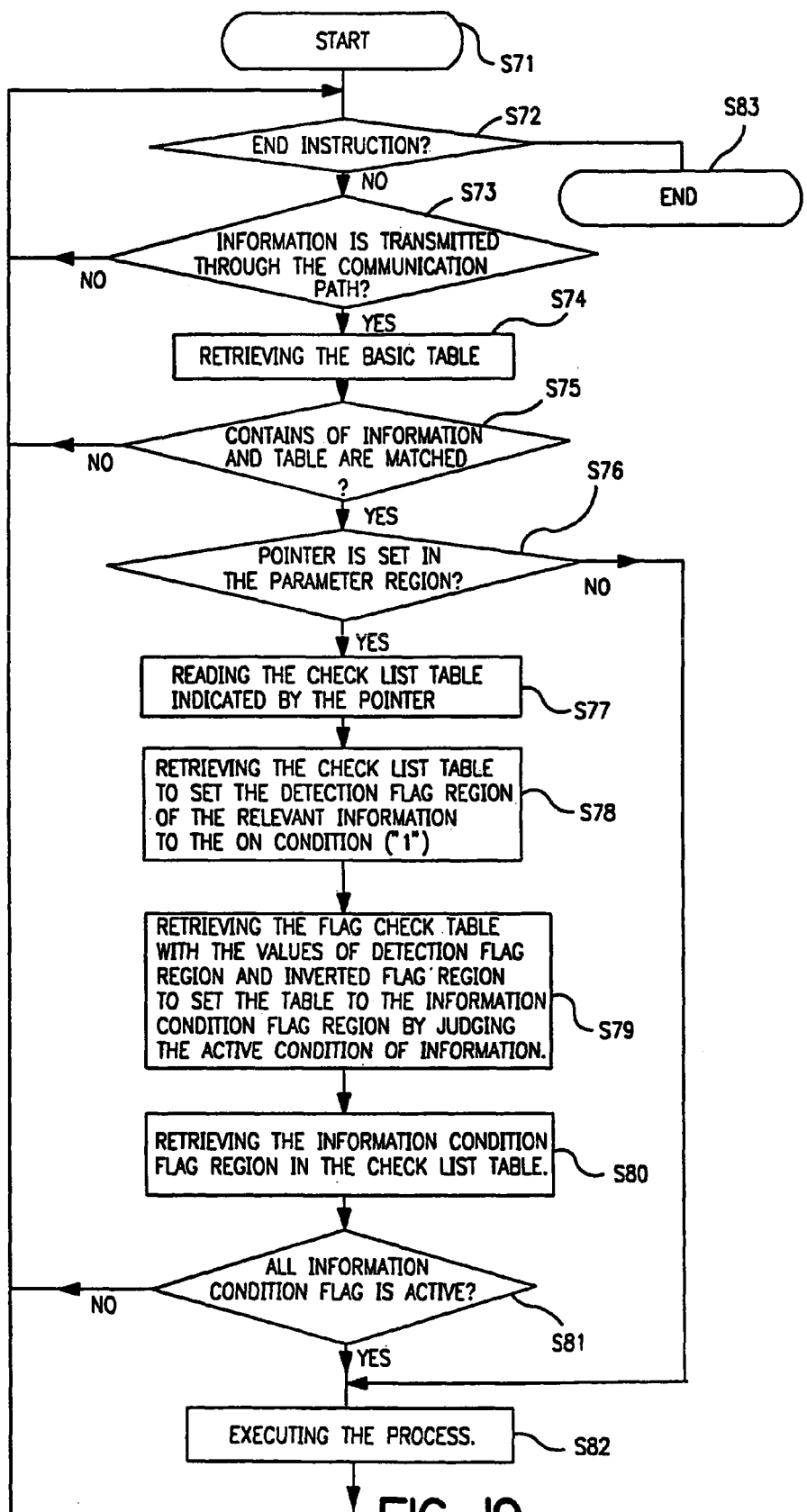
FIG. 19 is a flowchart illustrating contents of a process in an information detecting section according to a preferred embodiment of the present invention.

The processing content of the information detection section in this preferred embodiment of the present invention will be explained with reference to FIG. 19. Information is detected in step S73, and basic table JT1 is retrieved first in step S74. When the relevant information exists in basic table JT1 (YES in step S75), it is judged in step S76 whether the pointer to check. list table JT2 is set in parameter region JT1-6. When the pointer is set (YES in step S76), check list table JT2 indicated by the pointer is read in step S77 to set detected flag region JT2-5a, JT25b of the relevant information to ON, or a "1" state in step S78. Moreover, flag check table JT3 is retrieved depending on the values of updated detected flag regions JT2-5a, JT2-5a and the values of inverted flag regions JT2-6a, JT2-6b of the relevant information in order to judge the activating condition, to set it to the information condition flag regions JT2-7a, JT2-7b in step S79. Thereafter, information condition flag regions JT2-7a, JT2-7b in relevant check list table JT2 are retrieved in step S80, to judge whether the values of all information condition flags JT2-7a, JT2-7b are in the. "Active" condition in step S81. When the values of all information condition flags JT2-7a, JT2-7b are in the "Active" condition (YES in step S81), processing content JT1-5 is set to basic table JT1 in step S82. When the value of only one information condition flag JT2-7a, JT2-7b is in the "Inactive" condition (NO in step S81), it is required to wait for the detection of the next information (steps S72, S73) because the conditions for execution of the process are not yet completed.

In the first and the second preferred embodiments, since only basic table JT1 is used, the process is executed only by judging whether the detected information is registered to basic table JT1. This means that execution of the process has been controlled only by the OR condition of the information. In the third embodiment, any one of parameters required for execution of processing content JT1-5 and a pointer of check list table JT2 can be set to parameter region JT1-6. As a result, when the parameter is set, the information is detected and processing content JT1-5 is executed, as in the case of the first and second embodiments. When the pointer is set, processing content JT1-5 is executed depending on the detecting condition of the information being registered in check list table JT2.

In this third preferred embodiment, detected flag region JT2-5 in check list table JT2 is judged for each detection of information to control the execution of the process until detection of a plurality pieces of information is verified, to control execution of the process depending on an AND condition of a plurality pieces of information. Moreover, processing execution can be controlled depending on a NOT condition of information with reference to inverted flag regions JT2-6a, JT2-6b and flag check table JT3. Moreover, processing control can also be executed depending on these combining conditions.

In addition, as illustrated in FIG. 20, it is also possible to control the process, depending on the number of times that information is detected, by providing a reaction control region JT2-8c of check list table JT2. In this case, it is also considered a method to control the execution of process by a count-up system in which a value of detected flag region JT2-5c is added for each detection of information, and the predetermined process is executed when the added value becomes equal to that of reaction control region JT2-8c. Moreover, it is also considered a method to control the execution of the process by a count-down system in which a value of reaction control region JT2-8c is subtracted for each detection of information, and the processing content is executed when the value becomes zero.

Thereby, an FOR control becomes possible, in addition to the AND, OR, NOT controls explained above. It is also possible to form the IF condition by combining these controls by generalizing JT1-6.

In this preferred embodiment, it is also possible to realize the structural condition using an extension table without providing a basic table, as described above. In this case, the reaction table is produced individually for each information group to be detected, and the information detecting section executes update of the flag region and the defined processing content by making reference to all reaction table groups corresponding to the next object. As a result, it is possible to execute the complicated processes while easily keeping the mild cooperation.

Figure 21:
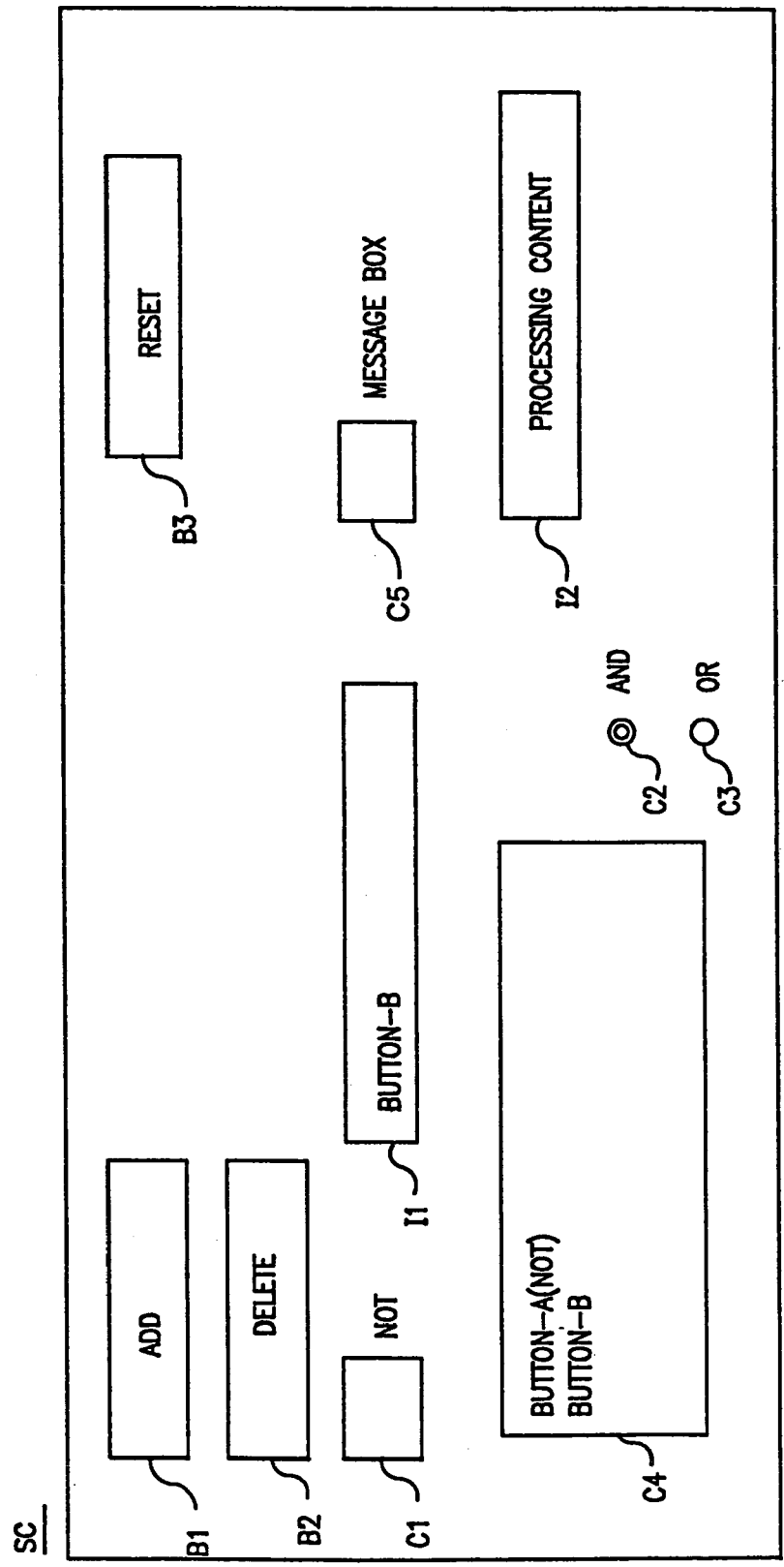
FIG. 21 is a schematic diagram illustrating a registered display image of an information reaction table according to a preferred embodiment of the present invention.
Figure 22:
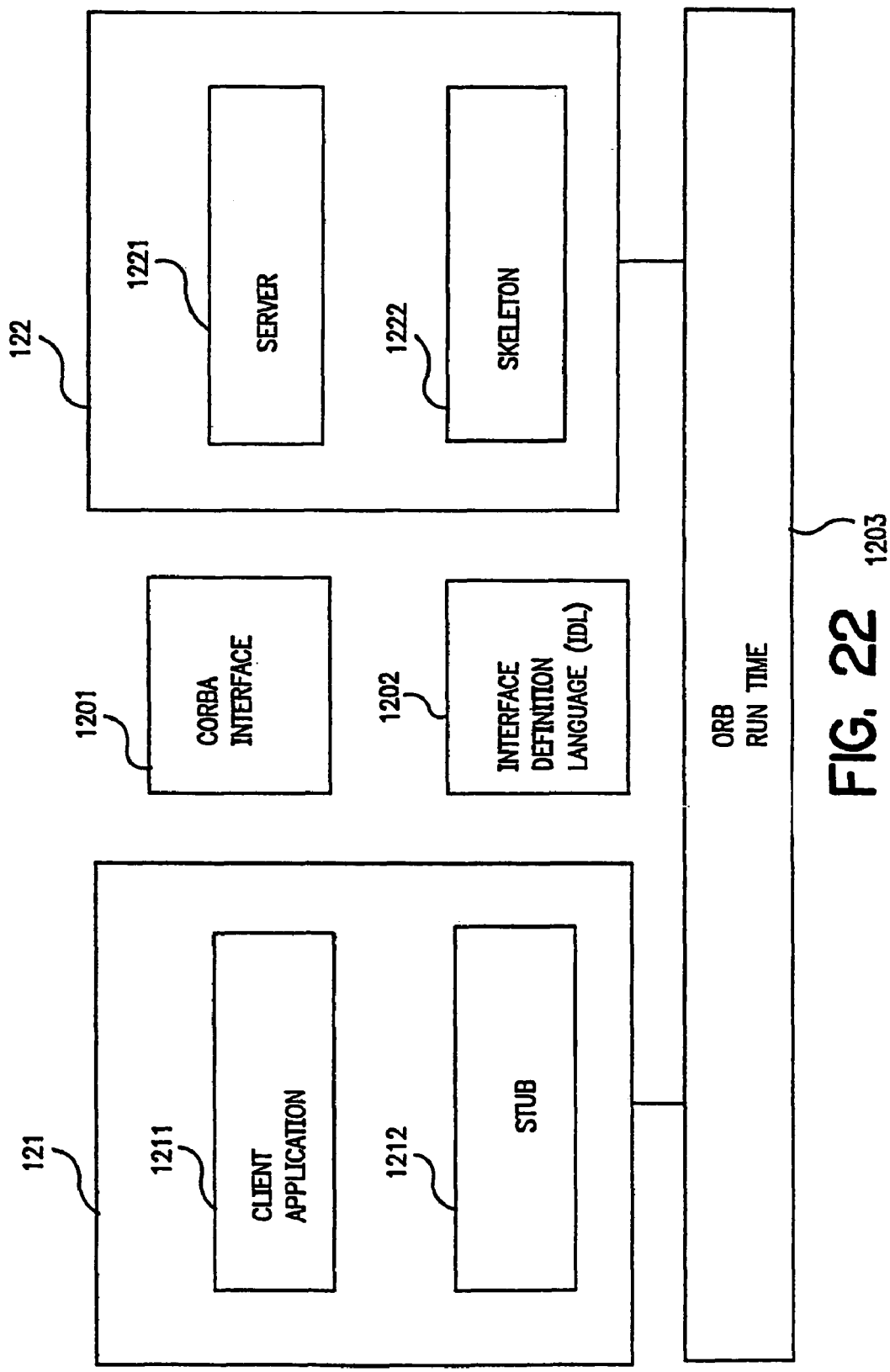
FIG. 22 (PRIOR ART) is a schematic diagram illustrating a prior art client'server system.

In regard to a fourth preferred embodiment of the present invention, a function to establish information reaction tables 103a, 203b, 303c will be explained. This function is offered as a function of the program to execute the functions explained above, and displays a setting image SC, as illustrated in FIG. 21, to more easily set information reaction tables 103a, 203b, 303c.

Setting image SC is formed of buttons B1, B2 for operating the information to be registered to information reaction tables 103a, 203b, 303c, an input region I1 for inputting the content of information to be registered, check boxes C1, C2, C3 for setting the relational formula of the information to be registered, a processing content input region 12 for setting the process content to be executed when the relevant registered information is detected, and a check box C4 for instructing whether the setting message is displayed as the message box. In the example of a registered image of the information reaction table illustrated in FIG. 21, input region I1 for inputting the content of information to be registered is formed as one frame, but display is conducted conforming to the format of the information, depending on how to regulate the information format in the cooperative system. In the embodiment explained previously, since the information format includes a subject, a verb, an object 1 and an object 2, the information is divided into four input regions which correspond to predetermined frames, or it may be registered in the information reaction table by automatically partitioning the content input with one character of the predetermined partitioning characters.

An Add button B1 is used for registering information to information reaction tables 103a, 203b, 303c. A Delete button B2 is used for deleting the information being registered to information reaction tables 103a, 203b, 303c. A Reset button B3 is used for resetting, to an initial condition, a region of which condition changes depending on detection of information such as detected flag regions JT2-5a, JT2-5b in information reaction tables 103a, 203b, 303c.

It is assumed that information is registered to the information reaction table. The information to be registered is input to input region I1. Here, information Button-A is registered under a NOT condition, and information Button-B is to be added. A relationship between information Button-A(not) and information Button-B to be registered is indicated by clicking an AND check box. Next, a process content to be executed when the information is detected is set in process content input region I2. In this case, it can be instructed by instructing check box C3 of the Message Box to display the message box at the time of displaying the message, depending on the process content. When Add button B1 is instructed, it can be recognized from the instruction content of the image that the Not Button-A ∩Button-B is instructed. When OR is designated, content of input to basic table JT1 is registered, because it is enough that individual reaction is made. In the AND condition, registration is required to both basic table JT1 and to the extension table. A pair of the input information is produced as one table. Moreover, when the NOT condition is being set, the process, such as setting of the initial condition of the inverted flag regions JT2-6a, JT2-6b to "1" is executed.

As explained above, since the information reaction table can visually be set, the information may be registered more easily when registering complicated processes.

In above preferred embodiments of the present invention, an information transmitting section and information detection section are provided for each object, but it is also possible to provide these sections for a personal computer system for common use by a plurality of objects. Moreover, the structure of each module is not limited to these preferred embodiments, since it is possible to provide the information reaction table within the information detecting section.

In regard to the content of the information reaction table, a verb, for example, illustrated in FIG. 8, is described. In this case, registration may be made based on the forward matching or backward matching method in which complete matching with "AddClipText", "AddClipFile", "AddClipMetaFile" can be obtained by defining "AddClip*". This also applies to subject, object 1 and object 2.

Moreover, control is also possible so that after previously confirming whether the object reacts by adding a flag, illustrated in FIG. 17, to the information transmitted from the information transmitting section, the official information is transmitted again, or the result of the reaction is returned from the object having received the information. More particularly, control is made so that the object having received the information transmitted executes the process content registered in the information reaction table, depending on the value of a flag Inform T6 (when the value is "0"), or registration of the process content as the content to be reacted in the information reaction table is returned without execution of such process content (when the value is "1").

Moreover, as illustrated in FIG. 17, it is also possible to control whether the process content in the object which has received the information should be notified, depending on the value of a flag Force T7. More particularly, when the value of flag Force T7 is "0", the process content is executed without notifying the result of the execution when the reaction is made by receiving the information transmitted, and when the value of flag Force T7 is "0", the execution result is returned.

While a LAN has been designated as a common communication, infrared communication such as IrDa, radio telecommunication such as hand-held telephone, PHS, or other communication means, such as a television broadcast signal may also be used as a common communication path.

Moreover, a protocol used for LAN includes User Datagram Protocol (UDP) and (IRC), but it is not limited thereto. For instance, UDP is the protocol ranked in the fourth layer of the Open Systems Interconnection ("OSI"), and provides connectionless communication. In UDP, the combination of an IP address and a port number is used for identifying an end point of communication, and thereby a plurality of destinations may be designated for one address. In UDP, controls for retransmission of packet, sequential control and flow control are not conducted. When UDP is used as the common communication path in a preferred embodiment of the present invention, the port number is related to the common communication path, and thereby the common accessible communication path can be obtained by using the common port number.

IRC is a system for realizing electronic conference on the basis of the text on the Internet, which was developed by Oikarinenn of the Finland Oulu Univ. in 1988. The protocol between server and client of this system is made public in the format of RFC1459. In IRC, a user can make conversation in the place called the channel, and this channel is spreading on the Internet by the cooperation protocol between the server and client of IRC. When IRC is used as the common communication path in the present invention, a channel is related to the common communication channel, and the common accessible communication path can be obtained by utilizing the common channel.

A memory medium described in a preferred embodiment of the present invention includes not only a portable medium such as magnetic tape, floppy disc or CD-ROM (magneto-optical disc memory medium), but also the system in which the transmission data is offered from the server and host center via the communication line.

According to the preferred embodiments of the present invention, an information transmitting portion is required only to transmit the information, without having to receive every message being transmitted and without having to execute the content of each message. As a result, it is necessary for the information receiving device to make a reaction or to respond only to information relevant to that receiving device. Moreover, since a receiving portion can freely evaluate the information received, it is now possible to form a flexible cooperative system without considering relationships between the transmitting side and receiving side. In addition, the AND, OR, NOT, IF controls are made possible by providing the flag region to the information reaction table, and also providing a means for judging the content of the flag region, and a so-called software logical circuit can also be realized. As a result, complicated process logic can also be developed while maintaining a more flexible cooperative processing system.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A method, comprising:
    storing a first set of reactions at a first computer, and a second set of reactions at a second computer including at least one reaction different from any reaction in the first set of reactions at the first computer, where each reaction in the first set comprises indicia of one of a plurality of operations available for performance on the first computer and execution information associated with each identified operation, and where each reaction in the second set comprises indicia of one of a plurality of operations available for performance on the second computer and execution information associated with each identified operation, where a format of the first and second sets of reactions includes a subject, a verb, one or more objects and processing content;
    storing a third set of reactions same as the first and second sets of reactions of the first and second computers, at a third computer performing one or more operations available for performance at the third computer;
    generating a transmission, sent via a common communication path common to the first, second and third computers, that includes an indicia of one or more performed operations by one of the first, second and third computers and information operated on by each of the one or more operations, a format of the indicia of operation including a subject, a verb, and one or more objects; and
    at each first, second and third computer, upon receiving an indicia of operation via the common communication path, determining whether the received indicia of operation matches a processing content of the independently stored set of reactions, and if it does, retrieving the matched processing content and performing an execution using the processing content matched with the received indicia of operation.

2. A computer-readable storage medium storing a program controlling a computer to perform a process comprising:
    executing original operations of different operation types;
    when original operations are executed, transmitting messages on a communication path, common to a plurality of objects, whereby each message is receivable by the plurality of objects, where the messages have a format shared by the objects, the message format including a subject, a verb, and one or more objects, and where each message indicates the operation type of its corresponding executed operation; and
    when messages so transmitted to the plurality of objects are detected from the communication path and received, determining whether to react to each message for each object of the plurality of objects based on each messages indicated operation type, and when determined to react to a given message, reacting by executing a reaction operation that is pre-associated with the messages indicated operation type, where each object has its own set of reaction operations including at least one reaction operation which is different from any reaction operation of another object pre-registered associations between the reaction operations of the object and at least some of the operation types, and a reaction set format that includes a subject, a verb, one or more objects and a reaction operation.

3. The computer readable storage medium of claim 2, wherein the original operations comprise graphical user interface events, and wherein the operation types comprise types of graphical user interface events.

4. The computer readable storage medium of claim 2, wherein the message further indicates a parameter of the original operation that triggered the message, and wherein the reaction operation triggered by the message uses as its own parameter the parameter included with the message that determined the execution of the reaction operation.

5. The computer readable storage medium of claim 2, wherein the communication path comprises a network chat channel.

6. The computer readable storage medium of claim 5, wherein the plurality of objects comprise programs executing on different computer systems.

7. A network communication method, comprising:
    executing original operations of different operation types;
    when original operations are executed, transmitting messages on a communication path, common to a plurality of objects, whereby each message is receivable by the plurality of objects, where the messages have a format shared by the plurality of objects, the message format including a subject, a verb, and one or more objects, and where each message indicates the operation type of its corresponding executed operation; and when messages so transmitted to the plurality of objects are detected from the communication path and received, determining whether to react to each message for each object of the plurality of objects based on each messages indicated operation type, and when determined to react to a given message, reacting by executing a reaction operation that is pre-associated with the messages indicated operation type, where each object has its own set of reaction operations including at least one reaction operation which is different from any reaction operation of another object pre-registered associations between the reaction operations of the object and at least some of the operation types, and a reaction set format that includes a subject, a verb, one or more objects and a reaction operation.

* * * * *

UNITED STATES PATENT AND TRADEMARK OFFICE
CERTIFICATE OF CORRECTION

| | | |
|---|---|---|
| PATENT NO. | : 7,735,092 B2 | Page 1 of 1 |
| APPLICATION NO. | : 10/652485 | |
| DATED | : June 8, 2010 | |
| INVENTOR(S) | : Makoto Okada et al. | |

It is certified that error appears in the above-identified patent and that said Letters Patent is hereby corrected as shown below:

Column 16, Line 32, change "messages" to --message's--.

Column 16, Line 35, change "messages" to --message's--.

Column 16, Line 39, change "object" to --object,--.

Column 17, Line 7, change "messages" to --message's--.

Column 17, Line 9, change "messages" to --message's--.

Column 18, Line 4, change "object" to --object,--.

Signed and Sealed this

Twenty-third Day of November, 2010

David J. Kappos
*Director of the United States Patent and Trademark Office*